United States Patent Office 3,636,010
Patented Jan. 18, 1972

3,636,010
ESTERS OF STEROID-17-CARBOXYLIC ACIDS
Georg Anner, Basel, and Charles Meystre, Reinach, Basel-Land, Switzerland, assignors to Ciba Geigy Corporation, Ardsley, N.Y.
No Drawing. Filed Dec. 10, 1969, Ser. No. 884,002
Claims priority, application Switzerland, Dec. 23, 1968, 19,190/68
Int. Cl. C07c 167/18, 169/12
U.S. Cl. 260—397.1                                8 Claims

ABSTRACT OF THE DISCLOSURE

Ester of $\Delta^{1,4}$-16α-methyl - 6α,9α - difluoro - 11β,17α-dihydroxy-3-oxo-androstadiene-17-carboxylic acid, its dehydro derivative and the corresponding compounds having an 11-oxo group instead of the 11β-hydroxy group having good anti-inflammatory and thymolytic activity.

SUMMARY OF THE INVENTION

The present invention is concerned with the manufacture of esters of steroid-17β-carboxylic acids and especially of esters of steroid-17-carboxylic acids of the formula (I)

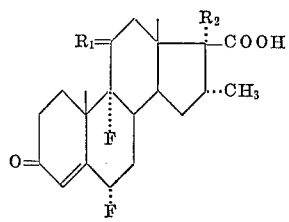

in which $R_1$ represents a β-hydroxyl group together with a hydrogen atom, or an oxo group and $R_2$ represents hydrogen or a free or esterified hydroxyl group, and of their 1-dehydro derivatives.

DESCRIPTION OF THE PREFERRED EMBODIMENTS

As esters of the said steriod-17β-carboxylic acids there may be specially mentioned those which are derived from lower aliphatic alcohols such as methanol, ethanol, propanol, isopropanol, the butyl or amyl alcohols, from araliphatic alcohols, especially from monocyclic aryl-lower aliphatic alcohols such as benzyl alcohol, or from heterocyclic alcohols, especially from tetrahydropyranol or tetrahydrofuranol. They may also be derived from dihydric alcohols such as ethyleneglycol or propyleneglycol, or from halohydrins, for example from ethylene-chlorohydrin, or from polyhydric alcohols such as glycerol. An esterified hydroxyl group $R_2$ is especially derived from organic carboxylic acids of the aliphatic, alicyclic, aromatic or heterocylic series, especially from those containing 1 to 15 carbon atoms, for example formic, acetic or propionic acid, from butyric acid, valeric acids such as n-valeric acid, or from trimethylacetic acid, from caproic acids such as β-trimethylpropionic acid or diethylacetic acid, from oenanthic, caprylic, pelargonic or capric acid, from undecylic acids, for example undecylenic acid, from lauric, myristic, palmitic or stearic acids, for example oleic acid, cyclo-propane-, -butane-, -pentane and -hexane-carboxylic acid, cyclopropylmethanecarboxylic, cyclobutylmethanecarboxylic, cyclopentylethanecarboxylic, cyclohexylethanecarboxylic acid, cyclopentyl-, cyclohexyl- or phenylacetic acids or propionic acids, benzoic acid, phenoxyalkane acids such as phenoxyacetic acid, p-chlorophenoxyacetic acid, 2,4-dichlorophenoxyacetic, 4-tertiary butylphenoxyacetic, 3-phenoxypropionic, 4-phenoxybutyric, furan-2-carboxylic, 5-tertiary butyl-furan-2-carboxylic, 5-bromo-furan-2-carboxylic acid, nicotinic or isonicotinic acid. Further suitable are lower aliphatic and monocyclic aromatic sulphonic acids such as methane-, ethane-, benzene- or p-toluenesulphonic acid, and also inorganic acids such as sulphuric or a hydrohalic acid and especially also phosphoric acids, for example ortho- or meta-phosphoric acid.

The new steroid-17β-carboxylic acid esters of this invention possess valuable pharmacological properties. Inter alia, they have especially a pronounced anti-inflammatory action as can be shown in animal tests, for example in the granuloma test on the rate on subcutaneous or oral administration of a dose of 10 to 30 mg./kg. and on local administration of a dose of about 0.1 to 5 mg./kg. Accordingly, the new compounds can be used as antiphlogistics similar to the corticoids. Moreover, especially after a systemic application, they display a strong thymolytic action. Furthermore, they may be used as intermediates for the manufacture of other useful substances, especially of pharmacologically active compounds.

Special mention deservies that $\Delta^{1,4}$-16α-methyl-6α,9α-difluoro - 11β,17α - dihydroxy - 3 - oxo - androstadiene-17β - carboxylic acid methyl ester which both on subcutaneous and oral administration of a dose of 10 to 30 mg./kg. in the said granuloma test on the rat displays a prounounced anti-inflammatory action. On local administration in the same test the compound has a good anti-inflammatory action when a dose of 0.3 to 1.0 mg./kg. is given. It acts also thymolytically on rates with a subcutaneous dose of 3 to 10 mg./kg. or an oral dose of 10 to 30 mg./kg.

The new steroid-17β-carboxylic acid esters of this invention can be manufactured in known manner, more especially by the process in which an acid of the above Formula I or a salt or corresponding 1-dehydro derivatives thereof are esterified, or in an ester of a carboxylic acid of the Formula I, in which $R_2$ represents a free hydroxyl group, or in a corresponding 1-dehydro derivative, this hydroxyl group is esterified or in an ester of a carboxylic acid of the formula

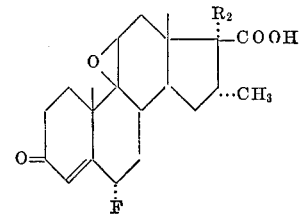

(II)

in which $R_2$ has the meaning given in Formula I, or in their 1-dehydro derivatives the 9β,11β-epoxide group is split up with hydrogen fluoride or with a hydrogen fluoride donor, and, if desired, a compound which is saturated in the 1,2-position is dehydrogenated in the 1,2-position, or in a compound which contains a double bond in the 1,2-position this double bond is saturated and/or an 11β-hydroxyl group is converted into an oxo group.

The esterification of the said steroid-17β-carboxylic acids according to this invention can be carried out in known manner. For example the starting material used is the free acid which is reacted with a reactive functional derivative of the alcohol concerned, such as an alkylhalide, for example an alkylbromide or chloride, or a dialkyl sulphate such as dimethylsulphate, in the presence of a base such as pyridine or sodium hydroxide solution, or the reaction is performed directly with the alcohol with addition of a dehydrating agent such as sulphuric or hydrochloric acid or zinc chloride. A particularly useful method of manufacturing the methyl ester is the reaction with diazomethane. Finally, the acid may also be converted into the corresponding acid chloride or bromide which is then reacted with the desired alcohol.

When the starting material used is a metal salt of the said acids, especially an alkali metal salt, the esters are manufactured according to this invention by reaction with a halogenohydrocarbon such as an alkylhalide, for example methyl bromide, ethyl chloride or benzyl chloride, in known manner.

The esterification of the 17α-hydroxyl group according to this invention may likewise be carried out in known manner. For this purpose the 17-carboxylic acid ester to be used as starting material is treated with a reactive functional derivative of the acid, for example of one of the acids mentioned above, such as a halide or the anhydride, advantageously in the presence of a tertiary organic base such as pyridine.

The 9β,11β-epoxide group in a compound of the Formula II is split in known manner with hydrogen fluoride, using it in the anhydrous form, if desired or required in an inert solvent such as chloroform, tetrahydrofuran or especially dimethylformamide or as aqueous hydrofluoric acid. It is also possible to use a hydrogen fluoride donor, for example a salt of this acid with a tertiary organic base, for example pyridine, or a derivative of hydrofluoric acid. A particularly valuable process is described and claimed in U.S. specification No. 3,211,758 according to which hydrogen fluoride is used in the form of an adduct thereof with carbamic or thiocarbamic acid, especially with urea.

The introduction of the 1,2-double bond according to this invention may be carried out with microbiological or chemical means. In the former case preferred use is made of microorganisms of the species *Corynebacterium simplex* or *Septomyxa affinis*. In the case of the chemical dehydrogenation a quinone having dehydrogenating action such as dichlorodicyanobenzoquinone, for example in a hydrocarbon such as toluene or dioxan or selenium dioxide in a tertiary alcohol, especially in tertiary amyl alcohol is used.

The selective saturation of a 1,2-double bond in a resulting $\Delta^{1,4}$-androstadiene-17β-carboxylic acid ester according to this invention may likewise be carried out in known manner, for example by selective hydrogenation in a homogeneous phase with tris-triphenylphosphine-rhodium chloride catalyst.

The dehydrogenation of an 11β-hydroxyl group according to this invention can likewise be carried out in known manner, for example with a compound of hexavalent chromium, for example chromium trioxide in pyridine.

Among the process products the lower alkyl esters, for example the methyl ester of $\Delta^{1,4}$-16α-methyl-6α,9α-difluoro-11β,17α-dihydroxy-3-oxo-androstadiene-17 - carboxylic acid and the corresponding 11-oxo compounds deserve special mention.

The $\Delta^{4}$-androstene-17β-carboxylic acids of the above formula to be used as starting materials as well as their 1-dehydro-derivatives and the salts of these compounds are new; they can be manufactured in known manner. According to a preferred method they are obtained when in a compound of the formula (III)

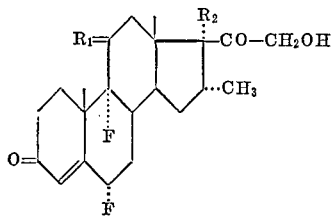

in which $R_1$ and $R_2$ have the same meanings as in Formula I, or in a corresponding 1-dehydro derivative, the pregnane side chain in 17β-position is degraded to the 17β-carboxyl group and, if desired, in a resulting compound which is saturated in position 1,2 dehydrogenation is performed in the 1,2-position, or in a compound which contains a double bond in the 1,2-position this double bond is saturated and/or an 11β-hydroxyl group is converted into an oxo group.

The pregnane side-chain can be degraded in known manner, for example preferably by oxidation with periodic acid. The reaction is carried out in a solvent that is inert to the oxidant, especially an ether such as dioxan, and usually at room temperature, using in general an aqueous solution of periodic acid.

The above-mentioned hydrogenation or dehydrogenation in position 1,2 or 11 respectively of the acids obtained can be performed in the manner described above for the corresponding esters.

The salts are manufactured, for example, by treating a solution or suspension of the acid in water, or in a mixture of water and alcohol with the calculated quantity of the base concerned, for example an alkali metal hydroxide, or with a carbonate or bicarbonate, for example potassium bicarbonate, and the salt is then isolated in known manner, for example by precipitation with a suitable solvent, or by crystallization while concentrating the resulting salt solution or by lyophilization.

The steroid-17β-carboxylic acids of the above Formula II, their 1-dehydro derivatives and their salts are suitable not only as starting materials for the manufacture of the said pharmacologically active esters but are also of pharmacological value of their own since they have an anti-inflammatory activity. Among the salts the alkali metal salts may be specially mentioned and in the first place the sodium and potassium salt, though also the alkaline earth metal salts, such as the magnesium or calcium salt, or salts of heavy metals, for example the salts of iron, zinc, copper or manganese are likewise suitable.

The invention includes also any variant of the present process in which an intermediate obtained at any stage thereof is used as starting material and any remaining step(s) is/are carried out or in which a starting material is formed under the reaction conditions.

The present invention includes also the manufacture of pharmaceutical preparations for use in human or veterinary medicine containing the new, pharmacologically active substances described above as active ingredients in conjunction or admixture with a pharmaceutical excipient. The excipients used are organic or inorganic substances suitable for enteral, for instance oral, parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly or cholesterol or other known medicinal excipients. The pharmaceutical preparations may be in solid form, for example tablets, dragees or capsules, or in liquid form or semiliquid form solutions, suspensions, emulsions, ointments or creams. If desired, these pharmaceutical preparations may be sterilized and/or contain assistants such as preserving, stabilizing, wetting or emulsifying agents, salts for regulating the osmotic pressure or buffers. They may also contain further therapeutically valuable substances. The new compounds may also be used as starting materials for the manufacture of other valuable compounds.

The compounds of this invention may also be used as additives to animal fodders.

The following examples illustrate the invention.

EXAMPLE 1

5 grams of $\Delta^{1,4}$-16α-methyl-6α,9α-difluoro-11β,17α,21-trihydroxy - 3,20 - dioxo-pregnadiene (flumethasone) are dissolved in 200 ml. of dioxan with heating. The solution is then cooled to 20° C. and within 5 minutes a solution of 12.5 g. of periodic acid in 100 ml. of water is stirred in dropwise. The solution is stirred on for 30 minutes, then mixed with 100 ml. of water and the dioxan is evaporated under vacuum. The precipitated crystalline product is suctioned off, washed with water and dried in a vacuum desiccator. The resulting product is the $\Delta^{1,4}$-16α-methyl-6α,9α,-difluoro - 11β,17α - dihydroxy-3-oxo-androstadiene-17-carboxylic acid which melts at 333° C. with decomposition. The acid is as such already rather pure but can be further purified by recrystallization from acetone or by dissolution in dilute sodium hydroxide solution and reprecipitation with dilute hydrochloric acid, giving a product of the identical melting point.

EXAMPLE 2

4 grams of the $\Delta^{1,4}$-16α-methyl-6α,9α-difluoro-11β,17α-dihydroxy - 3 - oxo-androstadiene-17-carboxylic acid obtained in Example 1 are suspended in a small quantity of water and acetone. Then 900 mg. of sodium bicarbonate are added to this suspension, whereupon a clear solution is obtained which is mixed with ethanol and concentrated under vacuum, during which the sodium salt of the said acid crystallizes out gradually; it is suctioned off, washed with a small quantity of ethanol and dried in a desiccator, to yield the crystalline sodium salt of $\Delta^{1,4}$ - 16α - methyl - 6α,9α-difluoro-11β,17α-dihydroxy-3-oxo-androstadiene-17-carboxylic acid. It chars, without melting, at about 340–380° C. It is readily soluble in water.

EXAMPLE 3

2 grams of the $\Delta^{1,4}$-16α-methyl-6α,9α-difluoro-11β,17α-dihydroxy-3-oxo-androstadiene - 17 - carboxylic acid prepared, for example, as described in Example 1, are suspended in acetone and an excess of an ethereal diazomethane solution is added, whereupon a clear solution results. The excess diazomethane is decomposed by adding the calculated quantity of acetic acid and the solution is evaporated under vacuum. The residue is dissolved in ethyl acetate, chromatographed on 50 g. of silica gel and eluted with ethyl acetate. The residue of the combined ethyl acetate eluates is crystallized from acetone+isopropylether, to yield the pure methyl ester of $\Delta^{1,4}$-16α-methyl-6α,9α-difluoro-11β,17α-dihydroxy - 3 - oxo-androstadiene-17-carboxylic acid. It melts first at 210° C., then solidifies and melts again at 223° C.

EXAMPLE 4

400 mg. of the $\Delta^{1,4}$-16α-methyl-6α,9α-difluoro-11β-17α-dihydroxy - 3 - oxoandrostadiene - 17 - carboxylic acid methyl ester obtained, for example, as described in Example 3, are dissolved in 3.5 ml. of pyridine and at 0° C. mixed with a solution, cooled at 0° C., of 400 mg. of chromium trioxide in 3 ml. of water and 3.5 ml. of pyridine. The mixture is kept for 20 hours at 20° C. The solution is then mixed with ice and at 0° C. slowly with an excess of sodium bisulphite solution. The mixture is then stirred for 30 minutes, during which its colour changes from brown to green. The crystalline precipitate is suctioned off and washed with water. The suction filter cake is then dissolved in hot ethyl acetate, the solution cooled and used for extracting the aqueous filtrate obtained on filtration. The ethyl acetate solution is successively washed with water, dilute hydrochloric acid, water, dilute potassium bicarbonate solution and once more with water, dried and finally evaporated under vacuum. The resulting residue is recrystallized from acetone+isopropyl ether, to yield 300 mg. of the $\Delta^{1,4}$-16α-methyl-6α,9α-difluoro - 17α - hydroxy - 3,11 - dioxo-androstadiene-17-carboxylic acid methyl ester melting at 285–287° C.

EXAMPLE 5

When 5 g. of $\Delta^4$-16α,methyl-6β,9α-difluoro-11β,17α,21-trihydroxy-3,20-dioxo-pregnene are treated with periodic acid as described in Example 1 and the product is dried in a desiccator, there is obtained the $\Delta^4$-16α-methyl-6α,9α-difluoro-11β,17α-dihydroxy - 3 - oxo-androstene - 17 - carboxylic acid melting at 300–304° C. with decomposition.

EXAMPLE 6

2 grams of the $\Delta^4$-16α-methyl-6α,9α-difluoro-11β,17α-dihydroxy-3-oxo-androstene-17-carboxylic acid, obtained for instance as described in Example 5, are methylated according to Example 3, to yield the pure methyl ester of $\Delta$ - 16α - methyl-6α,9α-difluoro-11β,17α-dihydroxy-3-oxoandrostene-17-carboxylic acid melting at 222–224° C.

EXAMPLE 7

430 mg. of the methyl ester of $\Delta^4$-16α-methyl-6α,9α-difluoro - 11β,17α - dihydroxy - 3 - oxo-androstene-17-carboxylic acid, obtained for example as described in Example 6, are dissolved in 3.5 ml. of pyridine and at 0° C. a solution of 430 mg. of chromium trioxide in 3 ml. of water and 4 ml. of pyridine, previously cooled at 0° C., is added. The mixture is kept for 20 hours at 20° and then mixed with ice and slowly with an excess of an aqueous sodium bisulphate solution. The mixture is stirred for 30 minutes at 0° C., extracted with ethyl acetate and the ethyl acetate extract is washed successively with water, dilute hydrochloric acid, water, dilute potassium bicarbonate solution and once more with water, dried and evaporated under vacuum to leave a residue which is recrystallized from acetone + isopropyl ether, leaving the pure methyl ester of $\Delta^4$-16α-methyl - 6α,9α - difluoro - 17α-hydroxy - 3,11 - dioxoandrostene-17β-carboxylic acid melting at 299–301° C. with decomposition.

EXAMPLE 8

Pharmaceutical preparation in form of an ointment for local administration containing as active ingredient the methyl ester of $^{1,4}$-16α - methyl-6α,9α-difluoro-11β,17α-dihydroxy-3-oxo-androstadiene-17-carboxylic acid.

| Ingredients: | Percent |
|---|---|
| White petroleum jelly paraffin oil | 65.0 |
| Higher aliphatic alcohols, waxes | 10.0 |
| Polyoxyethylene-sorbitan derivatives sorbitan fatty acid ester | 4.5 |
| Preservative | 0.2 |
| Perfume | 0.1 |
| Water | 19.2 |
| Methyl ester of $\Delta^{1,4}$-16α - methyl - 6α,9α- difluoro - 11β,17α - dihydroxy-3-oxoandrostadiene - 17 - carboxylic acid | 1.0 |

Formulation

The fats and the smulsifiers are melted together, the preservative is dissolved in water and this aqueous solution emulsified with the melt at an elevated temperature. During the cooling of the resulting emulsion a suspension of the active ingredient in a part of the melt is worked into the emulsion and the perfume is then added.

What is claimed is:

1. A member selected from the group consisting of a steroid-17-carboxylic acid of the formula

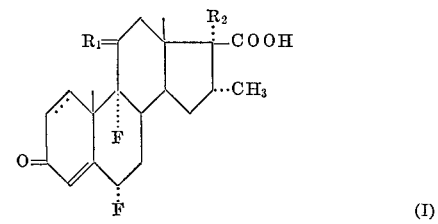

(I)

in which $R_1$ is a member selected from the group consisting of a β-hydroxy group together with hydrogen and an oxo group, and $R_2$ is a member selected from the group consisting of hydrogen, a free and an esterified hydroxy group, and the corresponding 1-dehydro and carboxylic acid metal salts thereof, and the esters of all these compounds derived from the carboxylic acid group at the 17-position.

2. A compound as claimed in claim 1, which is a member selected from the group consisting of lower aliphatic ester of an acid of the Formula I and a 1-dehydro derivative thereof.

3. A compound as claimed in claim 1 which is the methyl ester of $\Delta^{1,4}$-16α-methyl-6α,9α-difluoro - 11β,17α-dihydroxy 3-oxo-androstadiene-17-carboxylic acid.

4. A compound as claimed in claim 1, which is the methyl ester of $\Delta^{1,4}$-16α - methyl-6α,9α - difluoro-17α-hydroxy-3,11-dioxo-androstadiene-17-carboxylic acid.

5. A compound as claimed in claim 1, which is the methyl ester $\Delta^4$-16α-methyl-6α,9α - difluoro - 11β,17α-dihydroxy-3-oxo-androstene-17-carboxylic acid.

6. A compound as claimed in claim 1, which is the methyl ester of the $\Delta^4$-16α - methyl - 6α,9α-difluoro-17α-hydroxy-3,11-dioxo-androstene-17-carboxylic acid.

7. A compound as claimed in claim 1, which is the $\Delta^{1,4}$-16α-methyl - 6α,9α - difluoro - 11β,17α-dihydroxy-3-oxo-androstadiene-17-carboxylic acid.

8. A compound as claimed in claim 1 whch is the sodium salt of the $\Delta^{1,4}$-16α - methyl-6α,9α-difluoro-11β,17α-dihydroxy-3-oxo-androstadiene-17-carboxylic acid.

References Cited

UNITED STATES PATENTS 3,063,990  11/1962  Kuehne ........ 260—239.55

OTHER REFERENCES

Zurcher, Helv. Chim. Acta, vol. XLVI, Fasc. VI, 1963, pp. 2054–2088.

LEWIS GOTTS, Primary Examiner

E. G. LOVE, Assistant Examiner

U.S. Cl X.R.

195—51; 260—239.5, 239.55 R; 424—242, 243

PO-1050
(5/69)

UNITED STATES PATENT OFFICE
CERTIFICATE OF CORRECTION

Patent No. 3,636,010      Dated January 18, 1972

Inventor(s) GEORGE ANNER ET AL

It is certified that error appears in the above-identified patent and that said Letters Patent are hereby corrected as shown below:

Column 8, line 1, delete "whch" and insert --- which ---; line 2, delete "$\Delta^{14}$" and insert --- $\Delta^{1,4}$ ---.

Signed and sealed this 11th day of July 1972.

(SEAL)
Attest:

EDWARD M. FLETCHER, JR.
Attesting Officer

ROBERT GOTTSCHALK
Commissioner of Patents